Nov. 17, 1970   A. DOLENC   3,541,344
DIESEL ELECTRIC LOCOMOTIVE
Filed Nov. 4, 1963
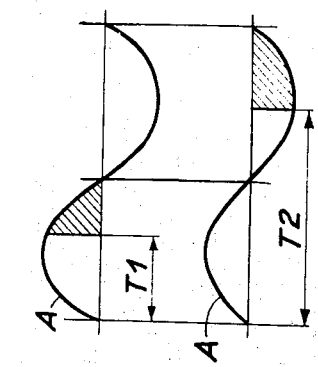
Fig.2
Fig.3
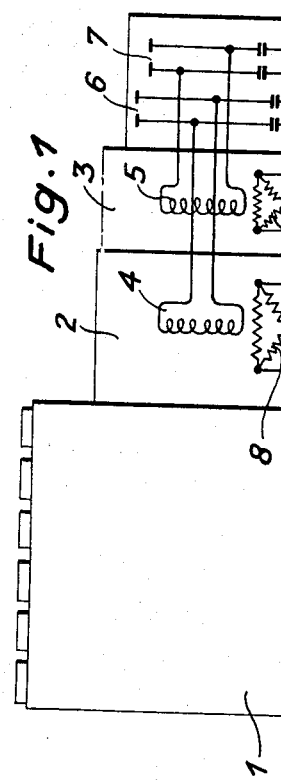
Fig.1
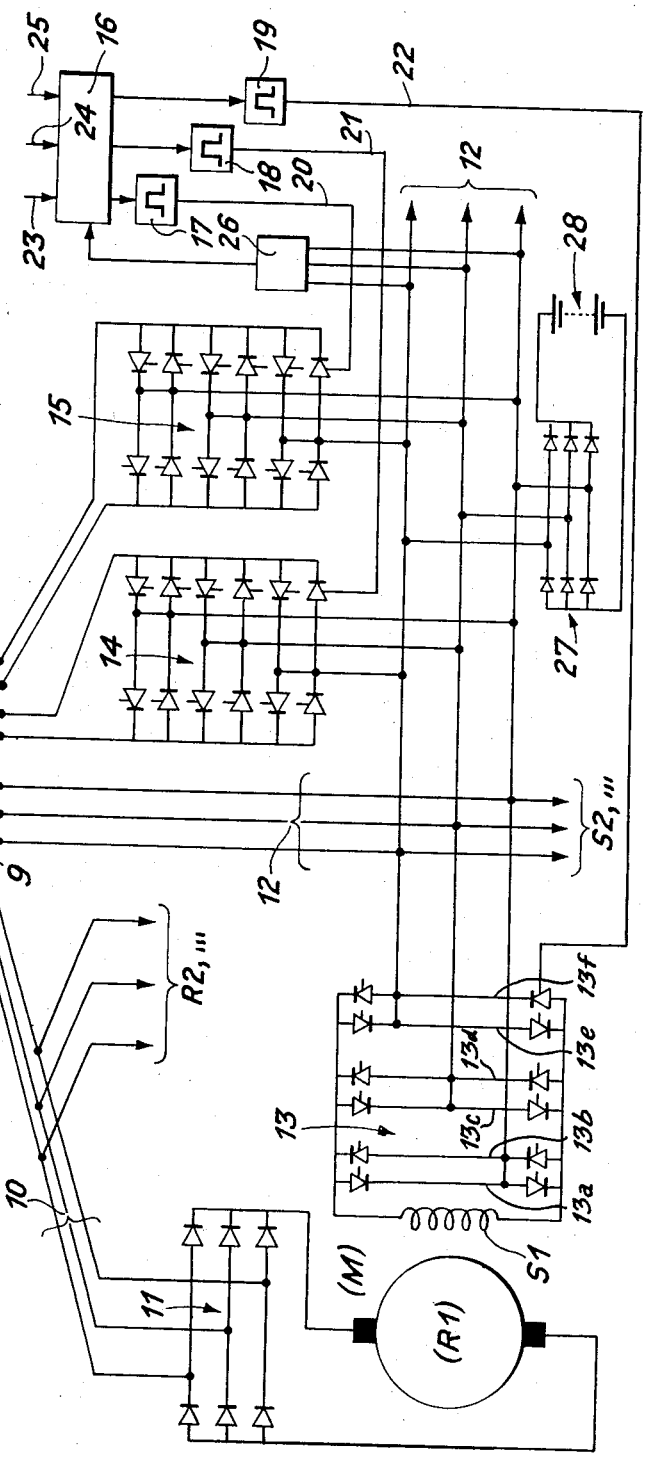
*Inventor:*
Anton Dolenc
BY Pennie, Edmonds,
Morton, Taylor and Adams
ATTORNEYS

United States Patent Office 3,541,344
Patented Nov. 17, 1970

3,541,344
DIESEL ELECTRIC LOCOMOTIVE
Anton Dolenc, Winterthur, Switzerland, assignor to Sulzer Brothers Limited, Winterthur, Switzerland, a Swiss company
Filed Nov. 4, 1968, Ser. No. 773,182
Claims priority, application Switzerland, Nov. 14, 1967, 15,917/67
Int. Cl. H02p 9/10
U.S. Cl. 307—43
4 Claims

ABSTRACT OF THE DISCLOSURE

A diesel electric locomotive is provided with a main alternating current (A.C.) generator for energizing the armature winding of at least one traction motor, and with a second A.C. generator the power winding of which is connected, via a rectifier bridge circuit comprising controlled rectifiers with phase control, to the excitation winding of the main A.C. generator. The power winding of the second A.C. generator is also connected via separate rectifier bridge circuits to the excitation windings of the traction motor and the second A.C. generator, and also to the electrically powered auxiliary equipment of the locomotive.

BACKGROUND OF THE INVENTION

Diesel electric locomotives having an alternating current (A.C.) generator for driving one or more traction motors are well known. Such locomotives have previously been provided with an auxiliary generator for supplying the excitation current of the main generator, the excitation of said auxiliary generator being used to influence the output of the main generator. The voltage of the power winding of the auxiliary generator varies within wide limits during operation. The auxiliary generator is, therefore, unsuitable as a power source for various loads, for example, locomotive auxiliaries, train heating, battery charging and the like. Accordingly, additional generators have had to be provided for such purposes. In these prior systems, the excitation current for the traction motor is supplied by the power winding of the main generator. Since the voltage characteristic of the main generator is varied in accordance with the power requirements of the traction motor, and as this variable voltage differs from the characteristics required for excitation of the traction motor, it has been necessary in many cases to employ tap-changing circuits with mechanical switches for controlling the excitation. Accordingly, current and power surges occur in operation. The switches have to be constructed for large currents and are correspondingly heavy and expensive. Moreover, to reverse the travelling direction it has heretofore been necessary to provide separate reversion switches for the traction motor to which the same objections apply.

The present invention provides a diesel electric drive for a locomotive in which a second A.C. generator simultaneously supplies current for the excitation of the main generator of the locomotive, for the internal excitation of the second generator, and for the excitation of the traction motors, as well as for the other purposes in the locomotive. My new diesel electric drive achieves a substantial simplification over prior drives along with direct and rapid regulation which is of particular importance in view of the sudden loadings of the main generator which can occur in operation, for example, in the event of flash over on the traction motor commutators.

SUMMARY OF THE INVENTION

The improved diesel electric drive of my invention comprises a diesel engine that drives a main alternating current (A.C.) generator that, in turn, supplies power to at least one traction motor, the diesel engine also driving a second A.C. generator, the power winding of which is connected to rectifier and control means that supply rectified current to the excitation winding of the main generator. In the preferred embodiment of my invention the power winding of the second generator is connected to separate rectifier and control means which supply rectified current to the excitation winding of the second generator and to the excitation windings of the traction motors. The rectifier and control means in each case advantageously comprise a rectifier bridge circuit that employs controlled rectifiers with phase control. Moreover, double bridges of phase controlled rectifiers are advantageously used so that the polarity of the current supplied to the traction motors can be reversed, whereby the direction of travel of the locomotive is reversed.

The rectifier and control means which supply rectified current from the second A.C generator to the excitation windings of this generator makes it possible for the second generator to be operated at a constant voltage in accordance with known procedures. Moreover, the rectifier and control means which supply rectified current from the power winding of the second generator to the excitation windings of the traction motors provide simple and inexpensive means for controlling the traction motor output without the need for costly elements adapted to act on the main current flowing through the motor rotors. Preferably, the excitation winding of each traction motor is separately connected to the power winding of the second generator by means of separate rectifier and control means. This feature makes it possible to supply a uniform current to each motor or, by separate control of each rectifier, to supply a different excitation current to each motor to compensate for different axle loadings or different frictional coefficients, and the like.

BRIEF DESCRIPTION OF THE DRAWINGS

The diesel electric drive of my invention will be better understood from the following description thereof in conjunction with the accompanying drawing of which:

FIG. 1 is a circuit diagram for a diesel electric locomotive according to the invention, and FIGS. 2 and 3 are diagrams illustrating the functioning of the phase control of double bridges of controlled rectifiers.

DETAILED DESCRIPTION

In the advantageous embodiment of my invention shown in FIG. 1, the diesel engine 1 of a diesel locomotive (not shown in detail) drives a main A.C. generator 2 and a second A.C. generator 3. The main generator 2 and the second generator 3 are provided with excitation windings 4 and 5, respectively, disposed in the rotor of each generator, the windings 4 and 5 being connected to the slip rings 6 and 7 of the machine. In addition, the A.C. generators, 2 and 3, are each provided with a three-phase power winding 8 and 9, respectively. The power winding 8 of the main generator 2 serves to drive the traction motors of the locomotive of which only one, the motor M, is shown in the drawing. Thus, the power winding 8 is connected by a three-phase line 10 and a rectifier bridge 11 to the rotor R1 of the motor M, the power winding 8 also being connected in like manner to the rotor R2 of a second traction motor (not shown) as indicated in the drawing. The power winding 9 of the second generator 3 supplies current for the excitation winding 4 of the main generator 2, as well as for other purposes, as hereinafter described. Thus, in the embodiment shown in the drawing, the power winding 9 is connected by the three-phase line 12 to the rectifier bridges 13, 14 and 15 which supply rectified, voltage controlled current to the excitation winding S1 of the traction motor M, to the excitation winding 4 of the generator 2 and to the excitation winding 5 of the generator 3, respectively. The power winding 9 also supplies current via line 12 to a rectifier bridge and the associated excitation winding S2 of a second traction motor (not shown) as indicated in the drawing.

The rectifier bridges 13, 14 and 15 each comprises a double bank of opposed rectifiers for each of the three phases of the alternating current being rectified, all of the rectifiers being controlled rectifiers with conventional phase control. For example, the double rectifier bridge 13 comprises pairs of opposed rectifiers 13a and 13b, 13c and 13d, and 13e and 13f, for each of the three phases being rectified. Depending on the magnitude and duration of the phase control voltage applied to each pair of opposed rectifiers by the regulator 16 and the pulse generator 19, either the bank of rectifiers 13a, 13c and 13e or the bank of rectifiers 13b, 13d and 13f will become conductive, thereby controlling the polarity of the rectified current flowing through the excitation winding S1 of the motor M. The double rectifier bridges 14 and 15 operate in like manner to control the polarity of the current supplied to the excitation winding 4 of the generator 2 and to the excitation winding 5 of the generator 3, respectively.

Phase control of the double rectifier bridges 13, 14 and 15 is applied by a regulator 16 via pulse generators 17, 18 and 19. The pulse generators 17, 18 and 19 are connected to the controlled rectifiers of the double bridges by the signal lines 20, 21 and 22 associated therewith to which they are interconnected in known manner. The regulator 16, which is not the subject of the present invention and is of conventional construction, is provided via signal lines 23, 24, 25 with set values for the individual operational variables which, in the illustrated example, are the magnitudes of the currents in the excitation windings 4, 5 and S1. At the same time the regulator 16 is supplied with the measured value obtained from a voltage-measuring apparatus 26 which measures the voltage in the line 12.

The diagrams, FIGS. 2 and 3, serve to explain the known function of phase control of a double bridge of controlled rectifiers. FIG. 2 shows one cycle of an alternating current A, which in the present case is the alternating current flowing in the line 12. In response to a signal from the regulator 16 the pulse transmitters 17, 18 or 19 "fire" (that is to say, render the associated rectifiers conductive) the rectifiers of the respective bridge after the period T1 has elapsed. The resultant current is indicated by hatching in FIG. 2, said current flowing until the voltage of the alternating current drops to zero. In this way it is possible to "extract" a pulsating D.C. current of any desired intensity from an alternating current by varying the time interval T1.

As can be seen from a comparison between FIGS. 2 and 3, phase control of the rectifier bridge also makes it possible to reverse the polarity of the current. For example, if the time interval T2 is selected so that, as indicated in FIG. 3, it is longer than the half-cycle of the alternating current, that part of the alternating current which is hatched in FIG. 2 will be allowed to pass, and a pulsating D.C. current of reverse polarity will be supplied to the excitation winding. It is therefore possible for the current flowing through the excitation winding to be regulated or reversed in a simple manner and in accordance with requirements.

During operation, the second generator 3, together with the rectifier bridges 13, 14 and 15 and the regulator 16, ensure a suitable supply of rectified current for the excitation windings of the traction motors, for the excitation windings of the generator supplying the traction motors and for the excitation windings of the second generator itself. Suitable operation of the double bridges 13, 14 and 15 by the regulator 16 enables the travelling direction of the locomotive to be reversed in a simple manner. At the same time the power winding 9 of the second generator 3 can supply, as already mentioned, current for electrically powered auxiliaries of the locomotive. For example, current from the power winding 9 can be supplied to a rectifier bridge 27, rectified current being employed to recharge storage battery 28 which, in turn, supplies current for starting the diesel engine 1 when the engine is not running. Other engine or locomotive auxiliaries can be supplied with current by the line 12 as indicated by the arrows on the right-hand side of FIG. 1 of the drawing.

I claim:

1. In a diesel electric drive for a locomotive comprising a diesel engine, first and second alternating current generators both driven by the diesel engine and each having a field winding and a power winding, and at least one traction motor having a field winding and having a power winding receiving power from the power winding of the first generator, the improvement which comprises separate controlled rectifier means connected between the power winding of the second generator and each of said field windings.

2. A diesel electric drive for a locomotive according to claim 1 wherein said rectifier means are phase controlled.

3. A diesel electric drive for a locomotive according to claim 1 in which the second generator is a constant voltage generator.

4. A diesel electric drive for a locomotive according to claim 1 wherein each of said rectifier means comprise a double rectifier bridge permitting reversal of the polarity of the current rectified thereby.

References Cited

UNITED STATES PATENTS 3,348,127 10/1967 Peterson _____ 322—59
3,351,845 11/1967 Roof et al. _____ 322—59
3,389,326 6/1968 Hyvarinen _____ 322—28

ROBERT K. SCHAEFER, Primary Examiner

H. J. HOHAUSER, Assistant Examiner

U.S. Cl. X.R.

322—28, 59